(12) United States Patent
Arockiasamy et al.

(10) Patent No.: US 9,977,636 B1
(45) Date of Patent: May 22, 2018

(54) METHOD AND SYSTEM FOR THE FLEXIBLE MERGING OF LOGICAL CELLS AND PRINTING

(71) Applicant: Xerox Corporation, Norwalk, CT (US)

(72) Inventors: Franklin Arul Raj Arockiasamy, Chennai (IN); Rahul Raj, Jharkhand (IN); Chiranjib Basu, West Bengal (IN); Devarajan Rajagopal, Salem (IN); Vivekprabhakaran Jaganathan, Tamilnadu (IN); Richard Immanuel Mathews, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days. days.

(21) Appl. No.: 15/356,735

(22) Filed: Nov. 21, 2016

(51) Int. Cl.
*G06K 15/00* (2006.01)
*G06F 3/12* (2006.01)
*H04N 1/00* (2006.01)

(52) U.S. Cl.
CPC ............ *G06F 3/125* (2013.01); *G06F 3/1206* (2013.01); *G06F 3/1253* (2013.01); *H04N 1/00161* (2013.01); *H04N 1/00196* (2013.01); *H04N 1/00456* (2013.01)

(58) Field of Classification Search
None
See application file for complete search history.

(56) References Cited

U.S. PATENT DOCUMENTS

| | | |
|---|---|---|
| 5,495,561 A | 2/1996 | Holt |
| 5,768,488 A | 6/1998 | Stone et al. |
| 6,046,818 A | 4/2000 | Benson |
| 7,177,045 B2 | 2/2007 | Goel et al. |
| 2008/0225306 A1 | 9/2008 | Shepherd et al. |
| 2012/0140251 A1 | 6/2012 | Grodsky et al. |
| 2012/0200580 A1 | 8/2012 | Gnanasambandam et al. |
| 2013/0258361 A1* | 10/2013 | Qian ............... G06K 15/02 358/1.9 |
| 2014/0253936 A1 | 9/2014 | Mizuguchi |
| 2014/0333947 A1 | 11/2014 | Robinson et al. |
| 2015/0138603 A1 | 5/2015 | Akiyama |
| 2016/0112586 A1 | 4/2016 | Miyazaki et al. |
| 2016/0231968 A1 | 8/2016 | Bracher et al. |
| 2016/0255727 A1 | 9/2016 | Zwiers et al. |

OTHER PUBLICATIONS

Xerox FreeFlow Print Server, printed Sep. 29, 2016, 3 pages.
JSON—Wikipedia, the free encyclopedia, printed Oct. 3, 2016, 10 pages.
Z-order—Wikipedia, the free encyclopedia, printed Oct. 3, 2016, 2 pages.

* cited by examiner

*Primary Examiner* — Dov Popovici
(74) *Attorney, Agent, or Firm* — Kermit D. Lopez; Luis M. Ortiz; Ortiz & Lopez, PLLC

(57) ABSTRACT

Methods and systems for the imposition of a print job. A grid composed of a 2D matrix of a group of logical cells can be graphically displayed in a graphical user interface. Each logical cell can be defined by a contiguous rectangular region made up cells of equal sized cells and wherein the grid directs the imposition of a print job. Graphical elements are also displayed in the graphical user interface, which when selected by a user allows for the merging of the logical cells across rows and columns of the grid for the imposition of the print job.

19 Claims, 9 Drawing Sheets

METHOD AND SYSTEM FOR THE FLEXIBLE MERGING OF LOGICAL CELLS AND PRINTING

TECHNICAL FIELD

Embodiments are generally related to the field of digital document processing. Embodiments are also related to printing methods and drivers and to the imposition of documents for rendering. Embodiments also relate to GUI (Graphical User Interface) applications and devices that facilitate the flexible merging of logical cells and document imposition.

BACKGROUND

In print shop environments, content from multiple sources is often merged to create a new document. For example, in the production of an illustrated calendar, photographs may be scanned to produce the calendar illustrations. The scans are then interleaved with calendar pages, which may have been produced in a page layout program or a word processor. Generally, before the document is output to a color printer, additional layout and job options are specified, such as single-side vs. duplex printing, resolution, color profile, and print profile. In particular, page imposition, in which selected individual pages are imposed on a single sheet, is an extremely useful layout option. The individual pages are arranged on the sheet to yield a proper page sequence in the finished document.

Page imposition is generally a technique for ordering the pages that make up a document on sheets in such a manner as to facilitate organizing the pages of the final printed document into the correct page sequence using post-printing processing techniques such as folding, cutting, collating, and binding. Page imposition greatly facilitates post-printing processes such as collating, cutting, and binding, so that a printed document with the pages in the correct orders results.

FIG. 1 illustrates an example of a prior art graphical user interface (GUI) 10 from a print shop system that allows a user to implement page imposition via a program layout by defining rows and columns. The GUI 10 displays a variety of a graphically displayed buttons, icons, menus, dialog box, and so on, such as, for example, icons 12, 14, 16, 18, 20, 22, 24, 26, and 28, which when accessed by a user provides, respectively, basic settings, paper stock, output, image quality, color management, image placement, image edit, special pages, and time stamps. Buttons 32, 34 provide for row and column settings, and icon 30 when accessed by a user provides for a layout type setting. Other graphical buttons or Icons include, for example, a widget 40 for sheet orientation, a radio button 46 for performing reduce/enlarge operations (i.e., "Fit to Page"), a radio button 44 for settings with respect to the outside margin, a radio button 42 for setting the outside margin, a widget 38 for selecting paper stock (e.g., letter-sized, legal-sized, etc.), a widget 36 for selecting a particular sequence, and a graphically displayed grid 48 that displays front and back parameters. Based on the grid 48, images can be applied. The GUI shown in FIG. 1, however, does not provide for an option to merge logical cells or to apply a page order/rotation to the image.

Thus, in prior art print shop systems such as the print system associated with the GUI 10 show in FIG. 1, a user is allowed to utilize a defined layout during the imposition process based on rows on columns. Images can be placed based on the grid 48. One of the problems with this approach, however, is that the user cannot navigate across the grid 48 to select rows and columns to merge and print. The user is simply unable to change the page order, orientation, and image rotation with respect to logical cells utilizing the GUI 10.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved imposition methods, systems, and devices.

It is another aspect of the disclosed embodiments to provide for a graphical user interface that allows a user to merge logical cells across rows and columns for use as part of an imposition process.

It is yet another aspect of the disclosed embodiments to provide for the placement images based on a grid as a part of an imposition process.

It is still another aspect of the disclosed embodiments to provide for a graphical user interface that allows a user to set imposition properties/attributes at the grid level.

The aforementioned aspects and other objectives and advantages can now be achieved as described herein. Methods and systems for the imposition of a print job are disclosed. In an example embodiment, a grid comprising a 2D matrix of a plurality of logical cells can be graphically displayed in a graphical user interface, wherein each logical cell among the plurality of logical cells is defined by a contiguous rectangular region comprising cells of the 2D matrix of equal sized cells and wherein the grid directs the imposition of a print job. Graphical elements are displayed in the graphical user interface that when selected by a user allow for the merging of the logical cells across rows and columns of the grid for the imposition of the print job.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Figure 1:
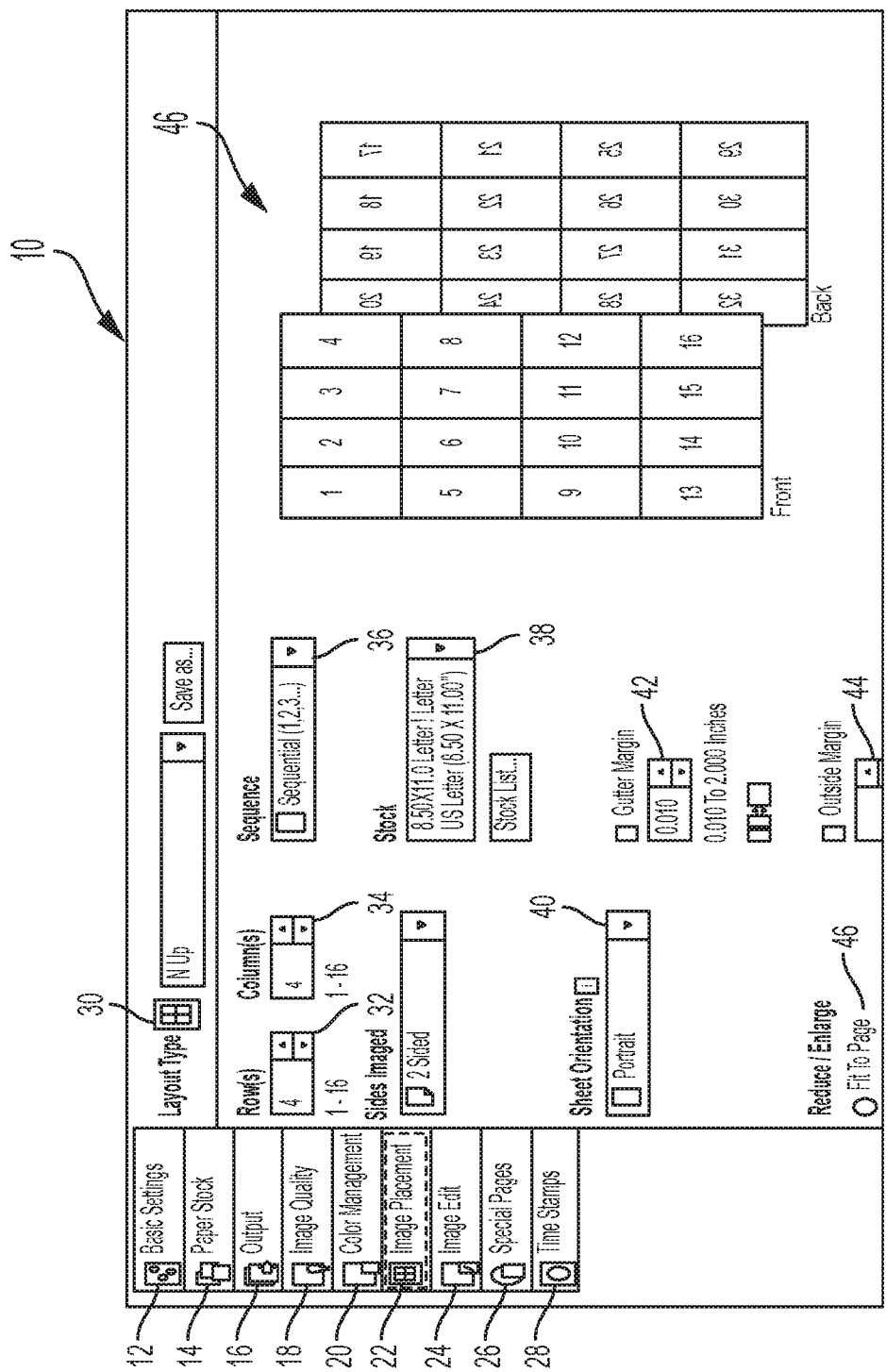
FIG. 1 illustrates an example of a prior art graphical user Interface (GUI) from a print shop system that allows a user to implement page imposition via a program layout by defining rows and columns.
Figure 2:
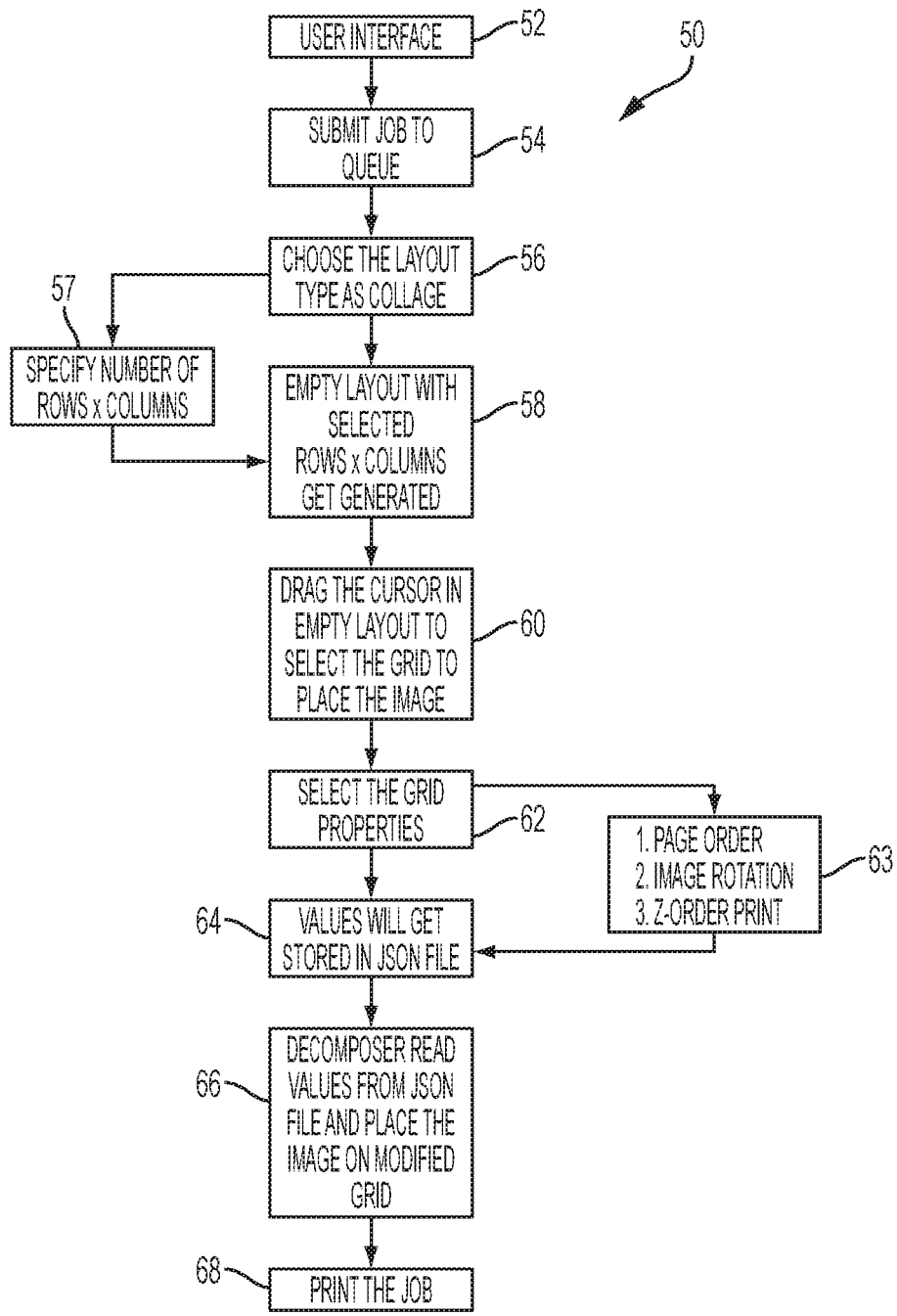
FIG. 2 illustrates a flow chart of operations depicting logical operational steps of a method for merging logical cells with respect to an image and printing the resulting image, in accordance with an example embodiment.

FIG. 2 illustrates a flow chart of operations depicting logical operational steps of a method 50 for merging logical cells with respect to an image and printing the resulting image, in accordance with an example embodiment. As depicted at block 52, a user interface (e.g., a GUI) can be graphically displayed. Note that as utilized herein, the term GUI or graphical user interface refers to a type of environment that represents programs, files, and options by means of icons, menus, and dialog boxes on the screen. The user can select and activate these options by pointing and clicking with a mouse, keyboard, or other user selection device such as a touch screen display. An example of a GUI that can be utilized in accordance with the operations shown in FIG. 2 is, for example, the GUI 70 described herein with respect to FIG. 3.

As shown next at block 54, a job can be submitted to a print queue. Thereafter as illustrated at block 56, an operation can be implemented via the GUI to choose the layout type as collage. Following processing of the operation depicted at block 56, a step operation can be implemented as illustrated at block 57 to specify the number of rows× columns via the GUI followed by an operation to empty the selected layout and generate the rows×columns as shown at block 58. Optionally, the operation depicted at block 58 may occur immediately after the operation shown at block 56 rather than immediately following the operation depicted at block 57.

Following processing of the operation described at block 58, an operation can be implemented through the GUI to drag the cursor in an empty layout to select the grid to place the image, as shown at block 60. Examples of such a grid are grid 120 depicted in FIGS. 3-4 and grid 121 depicted in FIG. 5. Thereafter, as illustrated at block 62, an operation can be implemented to select the grid properties. Then, as shown at block 63, an operation can be processed/implemented via the GUI to designate the page order, rotate the image, and implement a z-order print. Then, as shown at block 64, values can be stored in a JSON (JavaScript Object Notation) file. Note that JSON is an example of an open-standard format that uses human-readable text to transmit data objects composed of attribute value pairs. Also, note that the operation depicted at block 64 can optionally occur immediately after implementation of the operation shown at block 62 rather than after the operation depicted at block 63.

Following implementation of the operation shown at block 64, a decomposer can read values from the JSON file and place the image on the modified grid as indicated at block 66. The print job can then be rendered (i.e., printed) as shown at block 68 according to the imposition set forth according to method 50.

Figure 3:
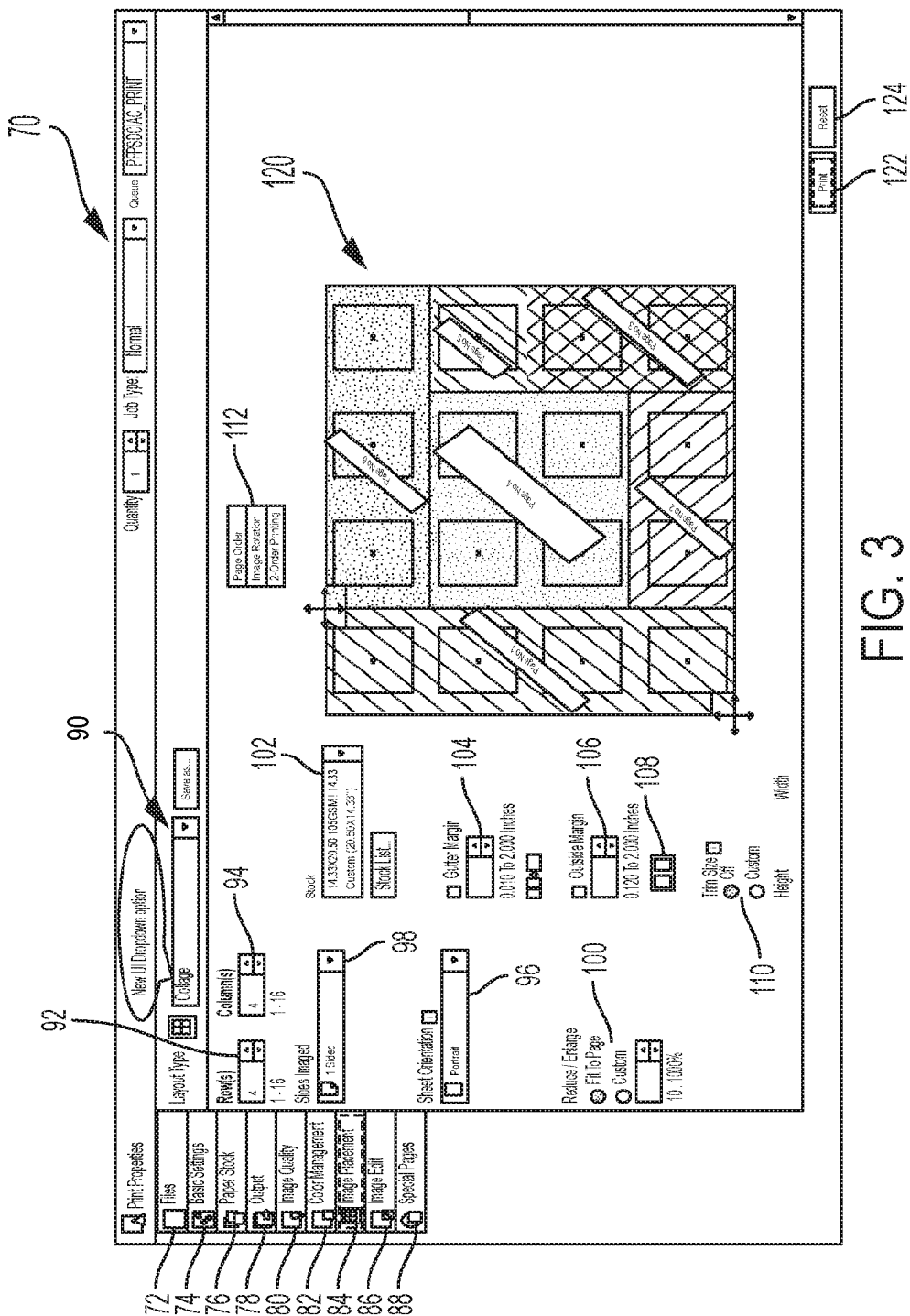
FIG. 3 illustrates a GUI for merging logical cells with respect to an image and printing the resulting image, in accordance with an example embodiment.

FIG. 3 illustrates an example GUI 70 for merging logical cells with respect to an image and printing the resulting image, in accordance with an example embodiment. The GUI 70 includes a number of GUI icons, menus, dialog boxes, and other widgets and graphically displayable features. For example, icons 72, 74, 76, 78, 80, 82, 84, 86, and 88 displayed at the left hand side of GUI 70 allow a user to access and modify, respectively, files, basic settings, paper stock, output, image quality, color management, image placement, image edit, and special pages. Other features provided by GUI 70 include setting the rows and columns via the respective selection icons or widgets 92 and 94. A sheet orientation drop down menu 96 allows for selection of a particular sheet orientation such as, for example, portrait. A section 98 provides the ability to print on one side or double sided. A section 100 provides widgets for reducing or enlarging the image and/or fitting the image to a page.

GUI 70 also displays a drop down menu 102 for selecting paper stock, a drop down menu 104 for selecting the outer margin, a drop down menu 106 for selecting the outside margin, a widget 108 for selecting a particular margin in inches, and radio buttons 110 for selecting a trim size. GUI 70 further includes a drop down menu 90 for selecting a layout type (e.g., collage, etc.). A grid 120 is displayed in GUI 70. Additional features included are the ability as shown at icon 112 to select the page order, an image rotation, and Z-Order printing. An icon 122 when selected by a user initiates the actual rendering/printing of the image with its imposed features. An icon 124 when selected by a user re-sets the imposition to a default or original setting.

The example GUI 70 depicted in FIG. 3 addresses the need to create a layout type referred to as a "collage" that allows a user to select the job orientation (e.g., portrait/landscape), the grid size (e.g., the number of rows and columns), and move across the original grid size to select the specified row and column to be merged. Different properties can be specified with GUI 70, such as, for example, the page order, image rotation, and Z-Order printing for each user-selected grid. Once the specified grid and properties are selected, the corresponding value can be passed to the aforementioned JSON file. The attributes set in the file can be passed to a decomposer module to perform job processing. The processed data can be sent to a marker to print as programmed. This approach allows for the merging of cells across rows and columns, and the ability to create a portrait and landscape orientation in the same sheet. The page order can be changed for each logical cell and an image rotation can be performed for each merged logical cell.

Figure 4:
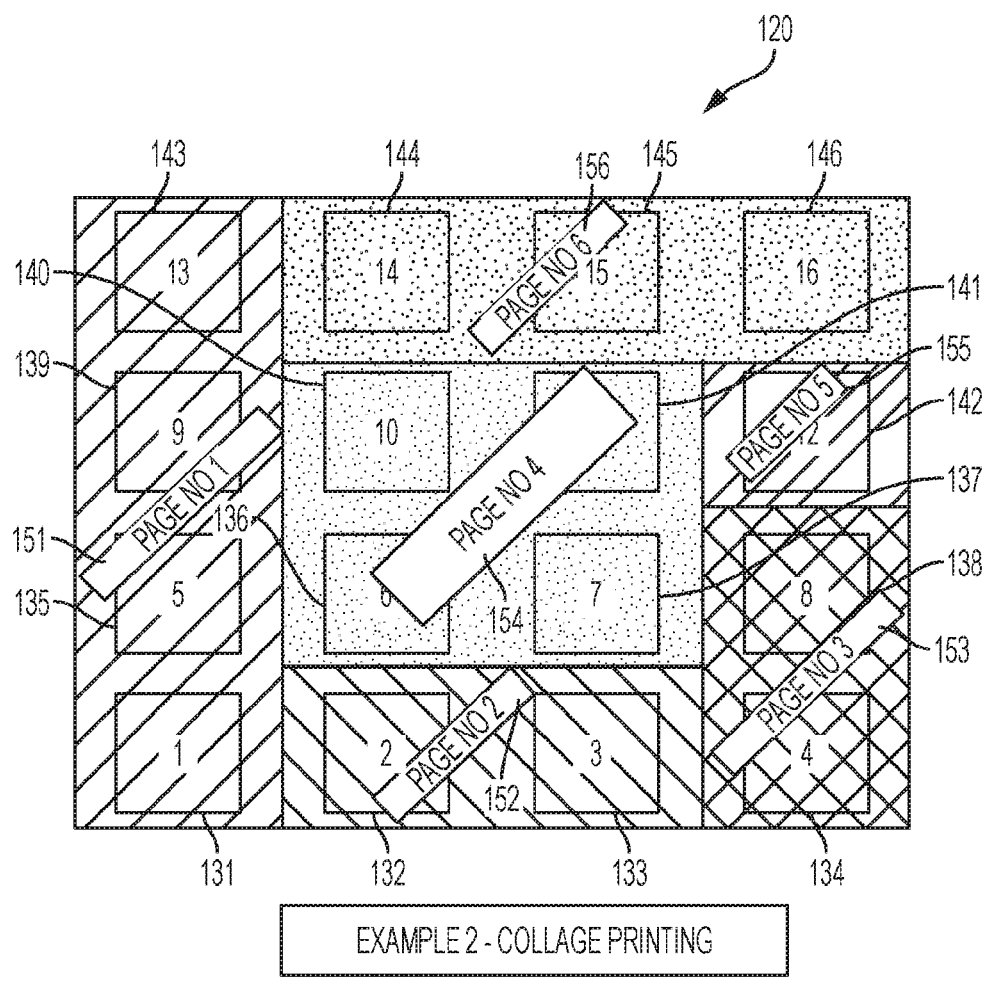
FIG. 4 illustrates a grid that can be implemented with a GUI shown in FIG. 3 in accordance with an example embodiment.

FIG. 4 illustrates a grid 120 that can be implemented with the GUI 70 shown in FIG. 3 in accordance with an example embodiment. The grid 120 depicted in FIG. 4 is set for collage printing and includes a number of cells 131, 132, 133, 134, 135, 136, 137, 139, 140, 141, 142, 143, 144, 145, 146 and rectangular boxes 151, 152, 153, 154, 155, 156 indicative of respective page numbers 1, 2, 3, 4, 5, and 6. The grid 120 thus provides "logical cells" (i.e., the aforementioned cells), wherein a cell can be defined by a contiguous rectangular region comprising cells of a 2D matrix of equal sized cells. In other words, the grid 120 shown in FIG. 4 (and similarly the grid 121 depicted in FIG. 5), is composed of such cells.

Figure 5:
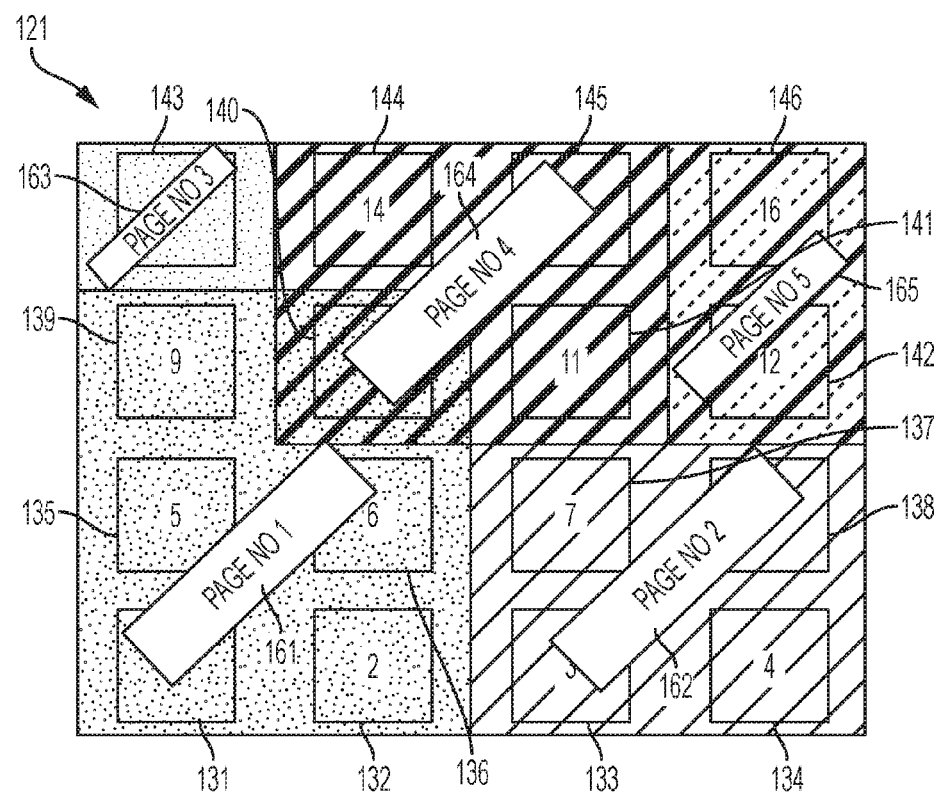
FIG. 5 illustrates a grid that can be implemented with a GUI shown in FIG. 3 in accordance with another example embodiment.

FIG. 5 illustrates a grid 121 that can be implemented with the GUI 70 shown in FIG. 3 in accordance with another example embodiment. The grid also includes cells 131, 132, 133, 134, 135, 136, 137, 139, 140, 141, 142, 143, 144, 145, 146 and rectangular boxes 161, 162, 163, 164, 165 indicative of respective pages numbers 1, 2, 3, 4, 5. The layout shown in FIG. 5 is for printing in a Z-Order fashion. Note that the term "Z-Order" as utilized herein refers to an ordering of overlapping two-dimensional objects, such as windows in a GUI, shapes in a vector graphics editor, or objects in a 3D application. One of the features of a GUI is that windows may overlap, so that one window hides part or all of another. When two windows overlap, their Z-Order determines which one appears on top of the other. The term "Z-Order" can refer to the order of objects along the Z-axis. In coordinate geometry, X refers to the horizontal axis (left to right), Y to the vertical axis (up and down), and Z refers to the axis perpendicular to the other two (forward or backward). One can think of the windows in a GUI as a series of planes parallel to the surface of the monitor. The windows are therefore stacked along the Z-axis and the Z-order information thus specifies the front-to-back ordering of the windows on the screen.

Figure 6:
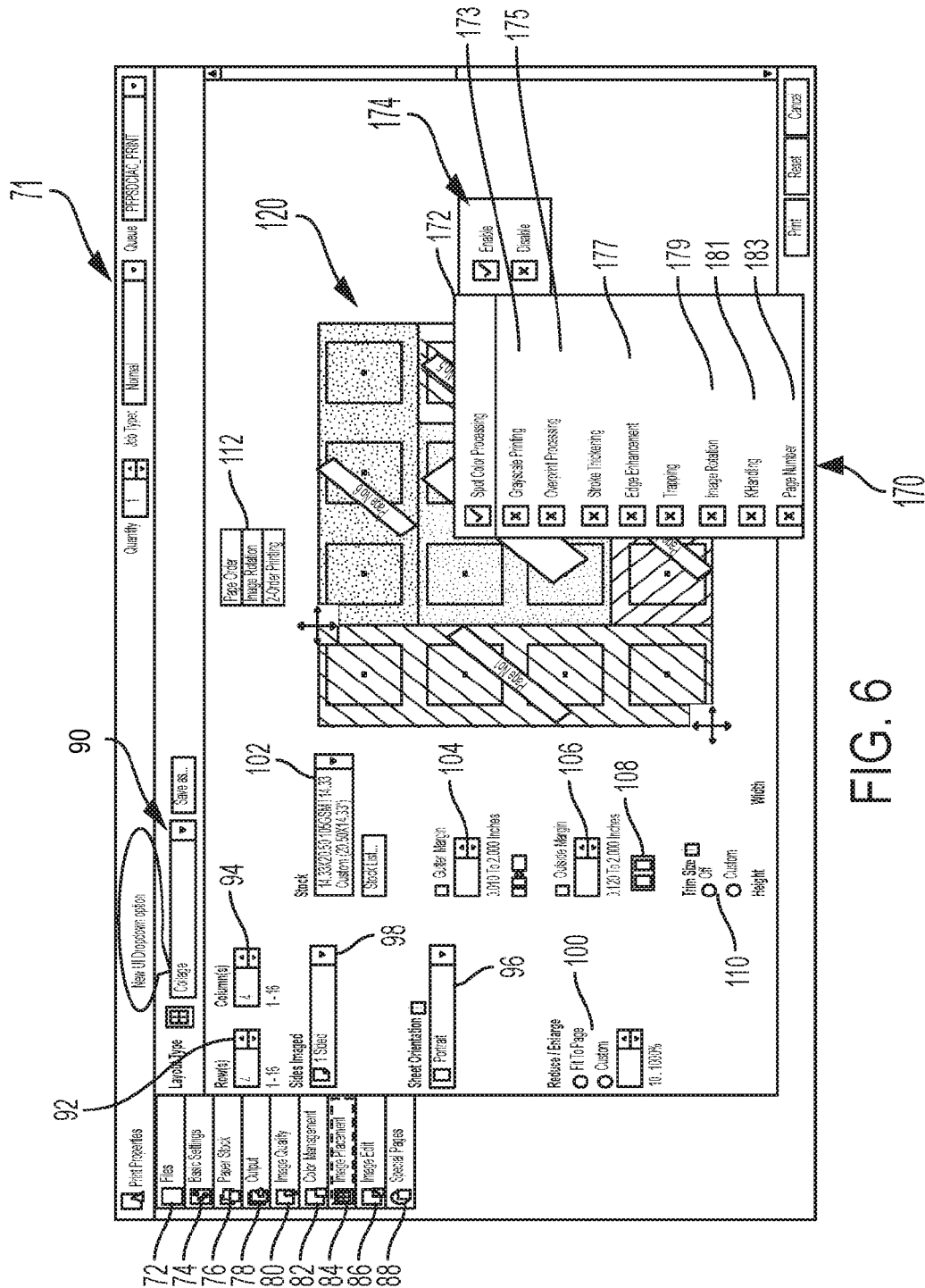
FIG. 6 illustrates a GUI that can be implemented, in accordance with another example embodiment.
Figure 7:
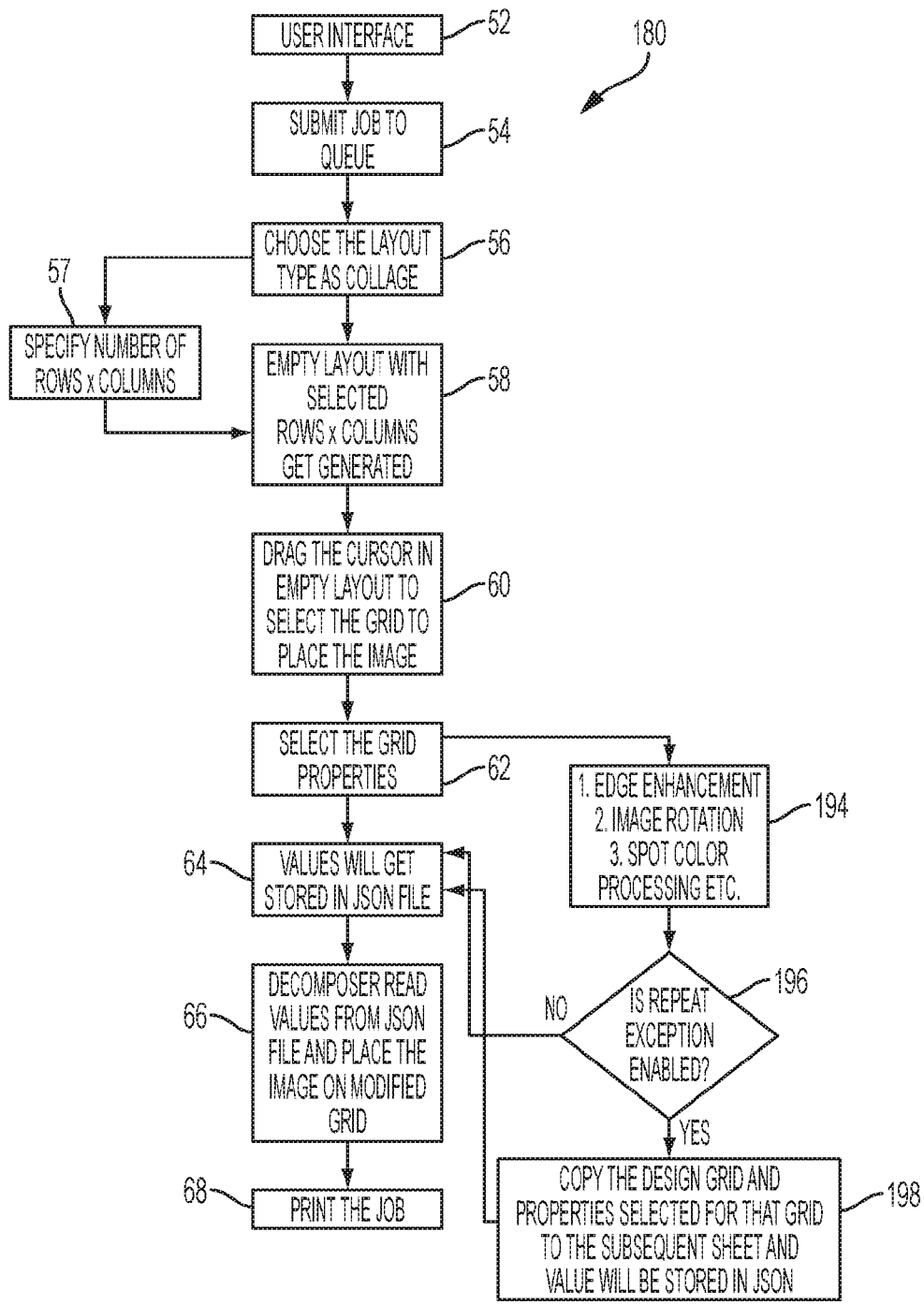
FIG. 7 illustrates a flow chart of operations depicting logical operational steps of a method for specifying exception handling of cells in a layout grid, in accordance with an example embodiment.

FIG. 6 illustrates a GUI 71 that can be implemented, in accordance with another example embodiment. Note FIGS. 6-7 illustrate an alternative embodiment including an alternative GUI and methodology. GUI 71 shown in FIG. 6 is similar to that of the GUI 70 shown in FIG. 3 and includes many of the same features such as the drop menu 90, the icons or widgets 72, 74, etc. The GUI 71, however, includes additional features and options including an additional graphically displayed area 170 that includes graphical elements 172, 173, 175, 177, 179, 181, and 183, which respectively allow a user to enable or disable (see the enable/disable icons 174) spot color processing, grayscale printing, overprint processing, stroke thickening, trapping, image rotation, K-handling, and page numbers (i.e., specifying page numbers to a particular grid, etc.). In other words, the user can set properties, attributes on the grid level. Once the grid is designed and properties have been set, a particular page (whichever page comes and occupy the grid) will inherit the grid properties. If the user enables a "Repeat-Grid-Exception" option, then the same grid design and properties will be applied to the subsequent sheet. Once the specified grid and properties are selected, the corresponding value will be passed to the JSON file. The attributes set in the file will be passed to a decomposer module to perform the job processing. The processed data will then be sent to a marker to print as programmed.

The benefit to the user is that the user does not need to think about which page is going to fit on a particular grid and the properties to be applied, because the user has designed the grid with all the properties set before submitting the job. The user can also specify the page number of the PDL file, which is going to occupy that grid. This approach helps the user to specify different page sequence with different properties on each grid while designing itself, which saves considerable time for setting properties each time for every job.

FIG. 7 illustrates a flow chart of operations depicting logical operational steps of a method 180 for specifying exception handling of cells in a layout grid, in accordance with an example embodiment. Note that the method 180 shown in FIG. 7 is similar to the method 50 depicted in FIG. 2 and includes some of the same operational steps/blocks. FIG. 7, however, includes several different operational blocks. For example, following the "select grid properties" operation illustrated at block 62, operations such as edge enhancement, image rotation, spot color processing, etc., can be implemented as indicated at block 194. Thereafter, as depicted at decision block 196, a test can be performed to determine if a repeat exception has been enabled. If the answer is "yes" with respect to the operation depicted at decision block 196, then the design grid and properties selected for that grid can be copied to the subsequent sheet and the value will be stored in the JSON file, as indicated at block 198. If not (in response to the decision block 196 operation), then the operations of blocks 64, 66, and 68 are implemented.

To summarize, the example embodiment described herein with respect to FIGS. 6-7 allows a user to set properties/attributes at the grid level, where the user designs the grid first. The user can select via, for example, a right click (e.g., with a 'mouse' or other pointing device') on any grid and set properties, such as, but not limited to the following:

Enable/Disable Spot Color Processing;
Enable/Disable Trapping;
Enable/Disable Grayscale Printing;

Enable/Disable Overprint Processing;
Enable/Disable Stroke thickening & Edge Enhancement;
Enable/Disable K-Handling;
Enable/Disable Image Rotation; and
Specify page number to a particular grid, etc.

Once the grid is designed and properties have been set, the particular page (whichever page comes and occupy the grid) will inherit the grid properties. If, however, the user enables the "Repeat-Grid-Exception" option, then the same grid design and properties will be applied to subsequent sheets.

Figure 8:
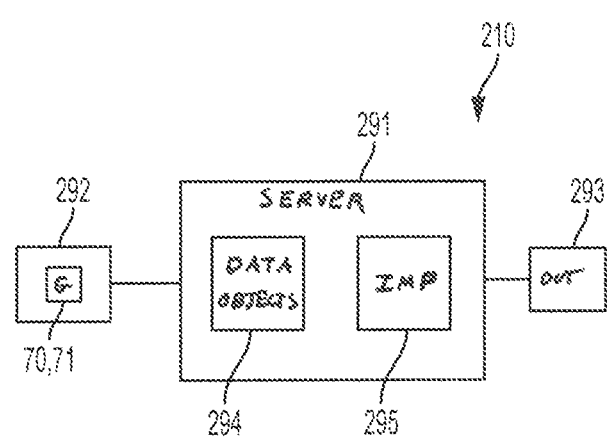
FIG. 8 illustrates a schematic diagram of a network-based system for formatting printable information, which can be adapted for use in accordance with an example embodiment.

FIG. 8 illustrates a schematic diagram of a network-based system 210 for formatting printable information, which can be adapted for use in accordance with an example embodiment. The system includes a server 291, any number of workstations 292 connected to the server 291, and one or more output devices 293 (labeled "OUT" in block 293 of FIG. 8), also connected to the server 291. At the workstation 292, users can create a variety of data objects, which can be subsequently selected and organized into a variety of digital documents. These data objects, typically pages created with word-processing or page layout programs, or images created with graphics programs may exist in a large number of formats. Furthermore, they may be stored locally on the workstation or they may be stored on the server. For purposes of organizing into digital documents, however, the data objects can be converted to a common file format and stored on the server, as a library of data objects 294. The common file format is a page description language.

To select from the library of objects, thumbnail images of the objects, also stored on the server, are displayed on the workstation and the user interacts with the thumbnail images using a pointing device such as a mouse to select and arrange the desired objects. A page imposition application 295, resident on the server and accessed by the user by means of a GUI (e.g., GUI 70 and/or GUI 71) residing on the workstation 292, allows the user to perform page imposition and other layout and pre-print processing techniques to the print job before it is finally sent to the output device 293. In the current embodiment, the output device is either a color printer or a color copier programmed to function as a printer. However, the output device may, in fact, be any device having a print engine. In professional printing environments, high performance output devices may automatically perform post-printing techniques such as folding, cutting, collation, and binding under the control of software programs residing on the server. While the system has been described as including one server, the system may actually include more than one server, with each server performing a dedicated function. For example, the object library may be archived on a file server and the software application may reside on an application server. The page imposition application 295 can implement instructions such as, for example, the instructions/operations/steps discussed herein with respect to FIGS. 2 and 7. The imposition application 295 (labeled as "IMP" in block 295 of FIG. 8) can also provide instructions for processing and display the various GUI's discussed herein.

Referring back to FIGS. 3 and 6, the GUI 70 or 71 (labeled simply "G" in FIG. 8) is resident on the workstation 292, by which a user gains access to the imposition application 295. The user makes use of the application's various functionalities by activating the corresponding elements of the interface. The imposition application can be configured as a module or group of modules, which implements instructions or steps such as those shown and described herein with respect to FIGS. 2 and 7.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products, and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises of one or more executable instructions for implementing the specified logical function(s). In some attemative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
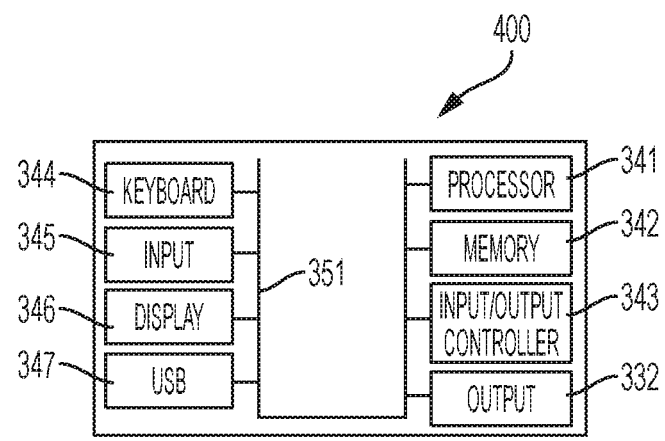
FIG. 9 illustrates a schematic view of a computer system, in accordance with an embodiment.
Figure 10:
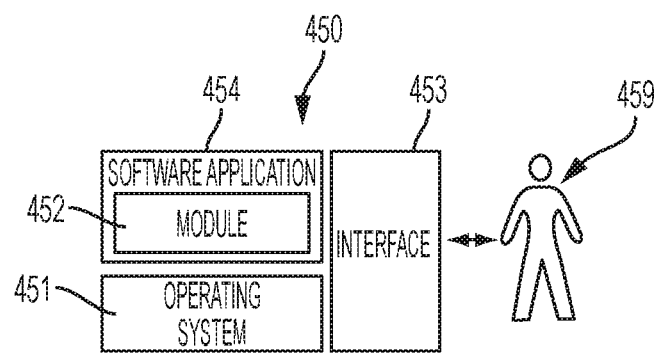
FIG. 10 illustrates a schematic view of a software system including a module, an operating system, and a user interface, in accordance with an embodiment.

FIGS. 9-10 are shown only as exemplary diagrams of data-processing environments in which embodiments may be implemented. It should be appreciated that FIGS. 9-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As Illustrated in FIG. 9, some embodiments may be implemented in the context of a data-processing system 400 that can include one or more processors such as the processor 341, the memory 342, an input/output controller 343, a peripheral USB—Universal Serial Bus connection 347, a keyboard 344 and/or another input device 345 (e.g., a pointing device, such as a mouse, track ball, pen device, etc.), a display 346, and output 332 to, for example, one or more output devices such as, for example, the output 293 shown in FIG. 8.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. Data-processing system 400 may be implemented in some embodiments as, for example, a server in a client-server based network (e.g., the Internet) or in the context of a client and a server (i.e., where aspects are practiced on the client and the server). For example, data-processing system 400 can implement the server 291 or the workstation 292 depicted in FIG. 8.

In yet other example embodiments, data-processing system 400 may be, for example, a standalone desktop computer, a laptop computer, a Smartphone, a pad computing device, and so on, wherein each such device is operably connected to and/or in communication with a client-server based network or other types of networks (e.g., cellular networks, Wi-Fi, etc.).

FIG. 10 illustrates a computer software system 450 for directing the operation of the data-processing system 400 depicted in FIG. 9. Software application 454, stored for example in memory 342, generally includes a kernel or operating system 451 and a shell or interface 453. One or more application programs, such as software application 454, may be "loaded" (i.e., transferred from, for example, mass storage or another memory location into the memory 342) for execution by the data-processing system 400. The data-processing system 400 can receive user commands and data through the interface 453; these inputs may then be acted upon by the data-processing system 400 in accordance with instructions from operating system 451 and/or software application 454. The interface 453 in some embodiments can serve to display results, whereupon a user 459 may supply additional inputs or terminate a session. The software application 454 can include module(s) 452, which can, for example, implement instructions or operations such as those of method 180 shown in FIG. 7 and discussed elsewhere herein. The interface 453 in some example embodiments implements the GUI's 70 and 71 described and illustrated herein. The software application 454 can also provide the page imposition application 295 in some example embodiments.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 9-10 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing it should be appreciated that a number of examples embodiments (e.g., preferred and alternative embodiments) are disclosed herein. For example, in one embodiment, a method for the imposition of a print job can be implemented. Such an example method can include steps/instructions, logical operations such as: rendering via a graphical user interface, a grid comprising a 2D matrix of a plurality of logical cells, wherein each logical cell among the plurality of logical cells is defined by a contiguous rectangular region comprising cells of the 2D matrix of equal sized cells and wherein the grid directs the imposition of a print job; and rendering elements via the graphical user interface that when selected by a user allows for the merging of the logical cells across rows and columns of the grid for an imposition of the print job.

In some example embodiments, the aforementioned step or operation of rendering via the graphical user interface the grid can further involve a step or operation for graphically displaying the grid in the graphical user interface. In yet another example embodiment, the aforementioned step or operation of rendering the elements via the graphical user interface can further involve a step or operation for graphically displaying the elements in the graphical user interface. In some example embodiments, the aforementioned elements are rendered via the graphical user Interface comprising of a plurality of objects, wherein at least one object among the objects when selected by a user allows for the merging of the logical cells across the rows and the columns of the grid for the imposition of the print job. In still another example embodiment, a step or operation can be provided for placing an image based on the grid as a part of the imposition of the print job.

In another example embodiment, steps or operations can be provided such as configuring the grid with a particular design; selecting the grid to set at least one property for the imposition, the grid having the particular design; automatically inheriting on at least one page of the print job, the at least one property; and passing a corresponding value associated with the grid and the at least one property for processing of the imposition with respect to the at least one page of the print job.

In still another example embodiment, a system for the imposition of a print job, the system can be implemented. Such an example system can include, for example, at least one processor, and a computer-usable medium embodying computer program code, the computer-usable medium capable of communicating with the at least one processor. The computer program code can include instructions executable by the at least one processor and configured for: rendering via a graphical user interface, a grid comprising a 2D matrix of a plurality of logical cells, wherein each logical cell among the plurality of logical cells is defined by a contiguous rectangular region comprising cells of the 2D matrix of equal sized cells and wherein the grid directs the imposition of a print job; and rendering elements via the graphical user interface that when selected by a user allows for the merging of the logical cells across rows and columns of the grid for an imposition of the print job.

In another example embodiment, a graphical user interface can be implemented for the imposition of a print job. In such a graphical user interface, a grid comprising a 2D matrix of a plurality of logical cells can be rendered via the graphical user interface, wherein each logical cell among the plurality of logical cells is defined by a contiguous rectangular region comprising cells of the 2D matrix of equal sized cells and wherein the grid directs the imposition of a print job. The aforementioned elements can be rendered via the graphical user interface such that when selected by a user allows for the merging of the logical cells across rows and columns of the grid for an imposition of the print job.

The claims, description, and drawings of this application may describe one or more of the instant technologies in operational/functional language, for example, as a set of operations to be performed by a computer. Such operational/functional description in most instances can be specifically-configured hardware (e.g., because a general purpose computer in effect becomes a special purpose computer once it is programmed to perform particular functions pursuant to instructions from program software). The disclosed claimed invention does not claim an abstract idea.

Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein can be a distillation of machine specifications or other physical mechanisms specified by the operations/functions such that the otherwise inscrutable machine specifications may be comprehensible to the human mind. The distillation also allows one skilled in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions are representative of static or sequenced specifications of various hardware elements. This is true because tools available to implement technical disclosures set forth in operational/functional formats—tools in the form of a high-level programming language (e.g., C, Java, Visual Basic, etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages.

It has been argued that because high-level programming languages use strong abstraction (e.g., that they may resemble or share symbols with natural languages), they are therefore a "purely mental construct" (e.g., that "software"—a computer program or computer-programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In an example embodiment, if a high-level programming language is the tool used to implement a technical disclosure in the form of functions/operations, it can be understood that, far from being abstract, imprecise, "fuzzy," or "mental" in any significant semantic sense, such a tool is instead a near incomprehensibly precise sequential specification of specific computational—machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory devices, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a microarchitecture that will carry out the instructions defined by that microprocessors defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute a shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second).

Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification, which selects out hardware logic gates, specifies voltage levels, voltage transition timings, etc., such that the humanly useful work is accomplished by the hardware.

Thus, a functional/operational technical description, when viewed by one skilled in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. Accordingly, any such operational/functional technical descriptions may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object, which has a stable, measurable, and changeable state may be used to construct a machine based on the above technical description. Charles Babbage, for example, constructed the first computer out of wood and powered by cranking a handle.

Thus, far from being understood as an abstract idea, it can be recognized that a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc., with natural language simply cannot be taken as an indication that such functional/operational technical descriptions are abstract ideas, or mere expressions of abstract ideas. In fact, as outlined herein, in the technological arts this is simply not true. When viewed through the tools available to those skilled in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person skilled in the art in understanding the described subject matter by providing a description that is more or less independent of any specific vendor's piece(s) of hardware.

The use of functional/operational technical descriptions assists the person skilled in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person skilled in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those skilled in the art by separating the technical descriptions from the conventions of any vendor-specific piece of hardware.

In view of the foregoing, the logical operations/functions set forth in the present technical descriptions are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one skilled in the art can readily understand and apply in a manner independent of a specific vendors hardware implementation.

At least a portion of the devices or processes described herein can be integrated into an information processing system. An information processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), or control systems including feedback loops and control motors (e.g., feedback for detecting position or velocity, control motors for moving, or adjusting components or quantities). An information processing system can be implemented utilizing suitable commercially available components, such as those typically found in data computing/communication or network computing/communication systems.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes or systems or other technologies described herein can be effected (e.g., hardware, software, firmware, etc., in one or more machines or articles of manufacture), and that the preferred vehicle will vary with the context in which the processes, systems, other technologies, etc., are deployed. For example, if an implementer determines that speed and accuracy are paramount, the implementer may opt for a mainly hardware or firmware vehicle; alternatively, if flexibility is paramount, the implementer may opt for a mainly software implementation that is implemented in one or more machines or articles of manufacture; or, yet again alternatively, the implementer may opt for some combination of hardware, software, firmware, etc., in one or more machines or articles of manufacture. Hence, there are several possible vehicles by which the processes, devices, other technologies, etc., described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. In an embodiment, optical aspects of implementations will typically employ optically-oriented hardware, software, firmware, etc., in one or more machines or articles of manufacture.

The herein described subject matter sometimes illustrates different components contained within, or connected with, different other components. It is to be understood that such depicted architectures are merely examples, and that in fact, many other architectures can be implemented that achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably coupleable" to each other to achieve the desired functionality. Specific examples of operably coupleable include, but are not limited to, physically mateable, physically interacting components, wirelessly interactable, wirelessly interacting components, logically interacting, logically interactable components, etc.

In an example embodiment, one or more components may be referred to herein as "configured to," "configurable to," "operable/operative to," "adapted/adaptable," "able to," "conformable/conformed to," etc. Such terms (e.g., "configured to") can generally encompass active-state components, or inactive-state components, or standby-state components, unless context requires otherwise.

The foregoing detailed description has set forth various embodiments of the devices or processes via the use of block diagrams, flowcharts, or examples. Insofar as such block diagrams, flowcharts, or examples contain one or more functions or operations, it will be understood by the reader that each function or operation within such block diagrams, flowcharts, or examples can be implemented, individually or collectively, by a wide range of hardware, software, firmware in one or more machines or articles of manufacture, or virtually any combination thereof. Further, the use of "Start," "End," or "Stop" blocks in the block diagrams is not intended to indicate a limitation on the beginning or end of any functions in the diagram. Such flowcharts or diagrams may be incorporated into other flowcharts or diagrams where additional functions are performed before or after the functions shown in the diagrams of this application. In an embodiment, several portions of the subject matter described herein is implemented via Application Specific Integrated Circuits (ASICs), Field Programmable Gate Arrays (FPGAs), digital signal processors (DSPs), or other integrated formats. However, some aspects of the embodiments disclosed herein, in whole or in part, can be equivalently implemented in integrated circuits as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software and/or firmware would be well within the skill of one skilled in the art in light of this disclosure. In addition, the mechanisms of the subject matter described herein are capable of being distributed as a program product in a variety of forms, and that an illustrative embodiment of the subject matter described herein applies regardless of the particular type of signal-bearing medium used to actually carry out the distribution. Non-limiting examples of a signal-bearing medium include the following: a recordable type medium such as a floppy disk, a hard disk drive, a Compact Disc (CD), a Digital Video Disk (DVD), a digital tape, a computer memory, etc.; and a transmission type medium such as a digital or an analog communication medium (e.g., a fiber optic cable, a waveguide, a wired communications link, a wireless communication link (e.g., transmitter, receiver, transmission logic, reception logic, etc.), etc.).

While particular aspects of the present subject matter described herein have been shown and described, it will be apparent to the reader that, based upon the teachings herein, changes and modifications can be made without departing from the subject matter described herein and its broader aspects and, therefore, the appended claims are to encompass within their scope all such changes and modifications as are within the true spirit and scope of the subject matter described herein. In general, terms used herein, and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Further, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense of the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense of the convention (e.g., "a system having at least one of A, B, or C" would include but not be limited to systems that have A alone, B alone, C alone, A and B together, A and C together, B and C together, and/or A, B, and C together, etc.). Typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, the operations recited therein generally may be performed in any order. Also, although various operational flows are presented in a sequence(s), it should be understood that the various operations may be performed in orders other than those that are illustrated, or may be performed concurrently. Examples of such alternate orderings include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for an imposition of a print job, comprising:
   rendering via a graphical user interface, a grid comprising a 2D matrix of a plurality of logical cells, wherein each logical cell among said plurality of logical cells is defined by a contiguous rectangular region comprising cells of said 2D matrix of equal sized cells and wherein said grid directs the imposition of the print job, wherein said imposition transforms digital data into a physical printed hardcopy of said print job;
   rendering elements via said graphical user interface that when selected by a user allow for merging of said logical cells across rows and columns of said grid for said imposition of said print job;
   storing said elements and associated values in an object notation file that uses human-readable text to transmit data objects composed of attribute value-pairs; and
   printing said print job as said physical printed hardcopy after said imposition of said print job.

2. The method of claim 1 wherein said rendering via said graphical user interface said grid, further comprises graphically displaying said grid in said graphical user interface.

3. The method of claim 1 wherein said rendering said elements via said graphical user interface, further comprises graphically displaying said elements in said graphical user interface.

4. The method of claim 1 wherein said elements rendered via said graphical user interface comprise a plurality of objects, wherein at least one object among said plurality of objects when selected by a user allows for said merging of said logical cells across said rows and said columns of said grid for said imposition of said print job.

5. The method of claim 1 further comprising placing an image based on said grid as a part of said imposition of said print job, said image comprising said digital data.

6. The method of claim 1 further comprising:
   configuring said grid with a particular design; and
   selecting said grid to set at least one property for said imposition, said grid having said particular design.

7. The method of claim 6 further comprising:
   automatically inheriting on at least one page of said print job, said at least one property; and
   passing a corresponding value associated with said grid and said at least one property for processing of said imposition with respect to said at least one page of said print job.

8. The method of claim 1 further comprising:
   configuring said grid with a particular design;
   selecting said grid to set at least one property for said imposition, said grid having said particular design;
   automatically inheriting on at least one page of said print job, said at least one property; and
   passing a corresponding value associated with said grid and said at least one property for processing of said imposition with respect to said at least one page of said print job.

9. A system for an imposition of a print job, said system comprising:
   at least one processor; and
   a computer-usable medium embodying computer program code, said computer-usable medium capable of communicating with said at least one processor, said computer program code comprising instructions executable by said at least one processor and configured for:
   rendering via a graphical user interface, a grid comprising a 2D matrix of a plurality of logical cells, wherein each logical cell among said plurality of logical cells is defined by a contiguous rectangular region comprising cells of said 2D matrix of equal sized cells and wherein said grid directs the imposition of the print job, wherein said imposition transforms digital data into a physical printed hardcopy of said print job;
   rendering elements via said graphical user interface that when selected by a user allow for merging of said logical cells across rows and columns of said grid for said imposition of said print job;
   storing said elements and associated values in an object notation file that uses human-readable text to transmit data objects composed of attribute value-pairs; and
   printing said print job as said physical printed hardcopy after said imposition of said print job.

10. The system of claim 9 wherein said rendering via said graphical user interface said grid, further comprises graphically displaying said grid in said graphical user interface.

11. The system of claim 9 wherein said rendering said elements via said graphical user interface, further comprises graphically displaying said elements in said graphical user interface.

12. The system of claim 9 wherein said elements rendered via said graphical user interface comprise a plurality of objects, wherein at least one object among said plurality of objects when selected by a user allows for said merging of said logical cells across said rows and said columns of said grid for said imposition of said print job.

13. The system of claim 9 wherein said instructions are further configured for placing an image based on said grid as a part of said imposition of said print job, said image comprising said digital data.

14. The system of claim 9 wherein said instructions are further configured for:
   providing said grid with a particular design; and
   selecting said grid to set at least one property for said imposition, said grid having said particular design.

15. The system of claim 14 wherein said instructions are further configured for:
   automatically inheriting on at least one page of said print job, said at least one property; and
   passing a corresponding value associated with said grid and said at least one property for processing of said imposition with respect to said at least one page of said print job.

16. The system of claim 9 wherein said instructions are further configured for:
   providing said grid with a particular design;
   selecting said grid to set at least one property for said imposition, said grid having said particular design;
   automatically inheriting on at least one page of said print job, said at least one property; and passing a corresponding value associated with said grid and said at least one property for processing of said imposition with respect to said at least one page of said print job.

17. The system of claim 13 further comprising a decomposer that reads values from said object notation file and places said image on said grid, wherein said grid now comprises a modified grid.

18. The system of claim 13 wherein said graphical user interface is configured for different properties to be specified including a page order, a rotation of said image and a Z-order printing for each user-selected grid.

19. A system for an imposition of a print job, said system comprising:
   at least one processor; and
   a computer-usable medium embodying computer program code, said computer-usable medium capable of communicating with said at least one processor, said computer program code comprising instructions executable by said at least one processor and configured for:
      rendering via a graphical user interface, a grid comprising a 2D matrix of a plurality of logical cells, wherein each logical cell among said plurality of logical cells is defined by a contiguous rectangular region comprising cells of said 2D matrix of equal sized cells and wherein said grid directs the imposition of the print job, wherein said imposition transforms digital data into a physical printed hardcopy of said print job;
      rendering elements via said graphical user interface that when selected by a user allow for merging of said logical cells across row and columns of said grid for said imposition of said print job;
      storing said elements and associated values in an object notation file that uses human-readable text to transmit data objects composed of attribute value-pairs;
      providing a decomposer that reads values from said object notation file and places an image on said grid, wherein said grid now comprises a modified grid;
      providing said grid with a particular design;
      selecting said grid to set at least one property for said imposition, said grid having said particular design;
      automatically inheriting on at least one page of said print job, said at least one property;
      passing a corresponding value associated with said grid and said at least one property for processing of said imposition with respect to said at least one page of said print job; and
      printing said print job as said physical printed hardcopy after said imposition of said print job, wherein said graphical user interface is configured for different properties to be specified including a page order, a rotation of said image and a Z-order printing for each user-selected grid.

* * * * *